(12) United States Patent
Hirabayashi et al.

(10) Patent No.: US 12,242,160 B2
(45) Date of Patent: Mar. 4, 2025

(54) ELECTROOPTICAL DEVICE AND ILLUMINATION DEVICE

(71) Applicant: Japan Display Inc., Tokyo (JP)

(72) Inventors: Yukiya Hirabayashi, Tokyo (JP); Osamu Kobayashi, Tokyo (JP); Shunpei Takeuchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 18 days.

(21) Appl. No.: 18/370,996

(22) Filed: Sep. 21, 2023

(65) Prior Publication Data

US 2024/0103324 A1 Mar. 28, 2024

(30) Foreign Application Priority Data

Sep. 28, 2022 (JP) .................................. 2022-155347

(51) Int. Cl.
*G02F 1/1345* (2006.01)
(52) U.S. Cl.
CPC ................... *G02F 1/1345* (2013.01)
(58) Field of Classification Search
CPC .............. G02F 1/1345; G02F 1/13452; G02F 1/13454; G02F 1/13456; G02F 1/13458
See application file for complete search history.

(56) References Cited

U.S. PATENT DOCUMENTS

| 2017/0059909 | A1* | 3/2017 | Koyama | ............... G02F 1/1368 |
| 2021/0199999 | A1* | 7/2021 | Ohira | ...................... G02F 1/137 |
| 2021/0405445 | A1 | 12/2021 | Ohira et al. | |

FOREIGN PATENT DOCUMENTS

JP 2020-149021 A 9/2020

* cited by examiner

*Primary Examiner* — Dung T Nguyen
*Assistant Examiner* — David Y Chung
(74) *Attorney, Agent, or Firm* — K&L Gates LLP

(57) ABSTRACT

An electrooptical device includes a first substrate, a first electrode disposed on the first substrate, a second substrate facing the first substrate, a second electrode disposed on the second substrate, and a liquid crystal layer positioned between the first substrate and the second substrate. The first substrate includes a first terminal, a second terminal, a first conductive portion electrically coupled to the first terminal, and a second conductive portion electrically coupled to the second terminal, the second substrate includes a third conductive portion electrically coupled to the second electrode, and a fourth conductive portion electrically coupled to the third conductive portion, and the electrooptical device further includes a first coupling member electrically coupling the first conductive portion and the third conductive portion, and a second coupling member electrically coupling the second conductive portion and the fourth conductive portion.

9 Claims, 6 Drawing Sheets

ELECTROOPTICAL DEVICE AND ILLUMINATION DEVICE

CROSS-REFERENCE TO RELATED APPLICATION

This application claims the benefit of priority from Japanese Patent Application No. 2022-155347 filed on Sep. 28, 2022, the entire contents of which are incorporated herein by reference.

BACKGROUND

1. Technical Field

The present disclosure relates to an electrooptical device and an illumination device.

2. Description of the Related Art

Japanese Patent Application Laid-open Publication No. 2020-149021 (JP-A-2020-149021) discloses a light adjustment device as an exemplary electrooptical device. The light adjustment device of JP-A-2020-149021 includes a first substrate, a second substrate facing the first substrate, a liquid crystal layer positioned between the first substrate and the second substrate, and a conductive pillar electrically coupling an electrode of the first substrate and a wire of the second substrate. Electric power is supplied to the electrode of the first substrate through the wire of the second substrate and the conductive pillar.

When a coupling member (conductive pillar) electrically coupling one of two substrates and the other substrate has a defect, for example, no electric power is supplied from a wire of the one substrate to an electrode of the other substrate and an electrooptical device potentially does not normally operate. Thus, it is desired to check that the one substrate and the other substrate are electrically coupled by the coupling member in the process of manufacturing such an electrooptical device.

The present disclosure is made in view of the above-described problem and intended to provide an electrooptical device in which conduction through a coupling member electrically coupling two substrates to each other can be checked.

SUMMARY

An electrooptical device according to an embodiment of the present disclosure includes a first substrate, a first electrode disposed on the first substrate, a second substrate facing the first substrate, a second electrode disposed on the second substrate, and a liquid crystal layer positioned between the first substrate and the second substrate. The first substrate includes a first terminal, a second terminal, a first conductive portion electrically coupled to the first terminal, and a second conductive portion electrically coupled to the second terminal, the second substrate includes a third conductive portion electrically coupled to the second electrode, and a fourth conductive portion electrically coupled to the third conductive portion, and the electrooptical device further includes a first coupling member electrically coupling the first conductive portion and the third conductive portion, and a second coupling member electrically coupling the second conductive portion and the fourth conductive portion.

DETAILED DESCRIPTION

Figure 1:
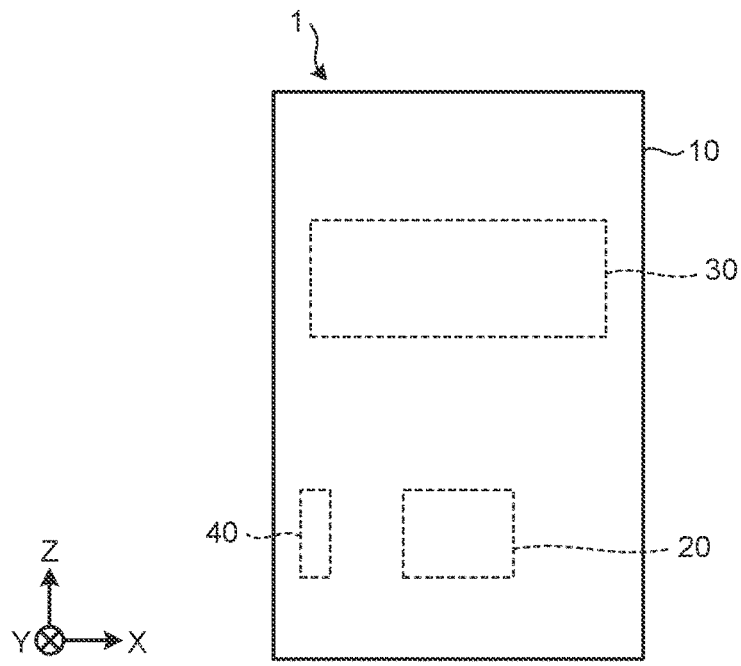
FIG. 1 is a schematic diagram of an illumination device according to an embodiment of the present disclosure.

Embodiments of the present disclosure will be described below with reference to the accompanying drawings. Contents described below in the embodiments do not limit the present disclosure. Components described below include those that could be easily thought of by the skilled person in the art and those identical in effect. Components described below may be combined as appropriate.

What is disclosed herein is merely exemplary, and any modification that could be easily thought of by the skilled person in the art as appropriate without departing from the gist of the invention is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

An X direction and a Y direction illustrated in the drawings are orthogonal to each other, and the positive and negative X sides in the X direction and the positive and negative Y sides in the Y direction correspond to sides of an illumination device 1. A Z direction is orthogonal to the X and Y directions. The positive Z side in the Z direction corresponds to a front surface side of the illumination device 1, and the negative Z side in the Z direction corresponds to a back surface side of the illumination device 1. In the present specification, "plan view" is a view of the illumination device 1 from one of the positive and negative Z sides in the Z direction. The X, Y, and Z directions are exemplary, and the present disclosure is not limited to these directions.

FIG. 1 is a schematic diagram of the illumination device 1 according to an embodiment of the present disclosure. The illumination device 1 includes a casing 10, a light source 20, an electrooptical device 30, and a control device 40 configured to comprehensively control the illumination device 1. The casing 10 houses the light source 20, the electrooptical device 30, and the control device 40.

The light source 20 emits light toward the electrooptical device 30. The light source 20 is, for example, a light bulb or a light emitting diode (LED).

The electrooptical device 30 transmits light emitted from the light source 20 so that the light is emitted out of the illumination device 1. The electrooptical device 30 diffuses light emitted from the light source 20. In the present embodiment, the electrooptical device 30 is a light adjustment device. The electrooptical device 30 may adjust the transmittance of light emitted from the light source 20.

Figure 2:
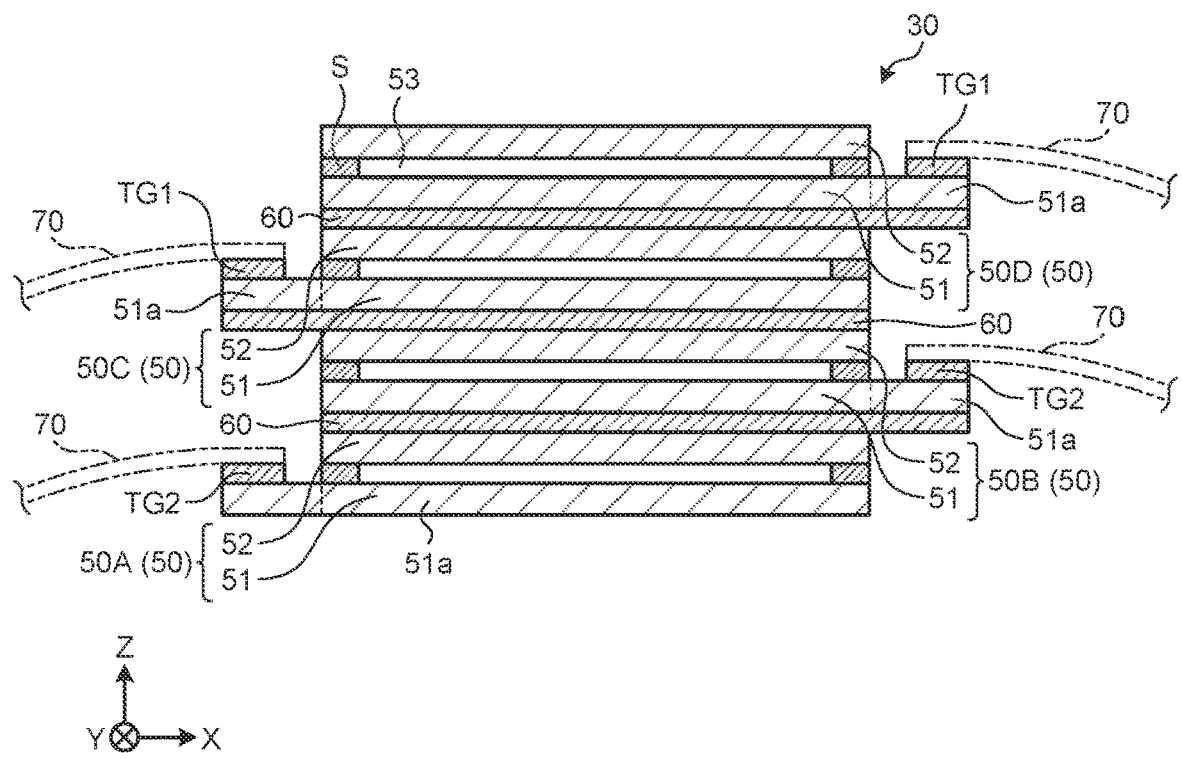
FIG. 2 is a sectional view of an electrooptical device.

FIG. 2 is a sectional view of the electrooptical device 30. The electrooptical device 30 includes a plurality of light adjustment panels 50. The number of the light adjustment panels 50 is four but not limited to four. The plurality of light adjustment panels 50 are stacked in the Z direction. Each two light adjustment panels 50 adjacent to each other in the Z direction are bonded to each other with a translucent bonding layer 60 interposed therebetween. The plurality of light adjustment panels 50 have the same configuration and are stacked in orientations different from one another about the Z direction (to be described later in detail).

Each light adjustment panel 50 includes a first substrate 51, a second substrate 52 facing the first substrate 51, a seal material S sealing the space between the first substrate 51 and the second substrate 52, and a liquid crystal layer 53 containing liquid crystal molecules. The plate surface of the first substrate 51 and the plate surface of the second substrate 52 each intersect the Z direction.

Figure 3:
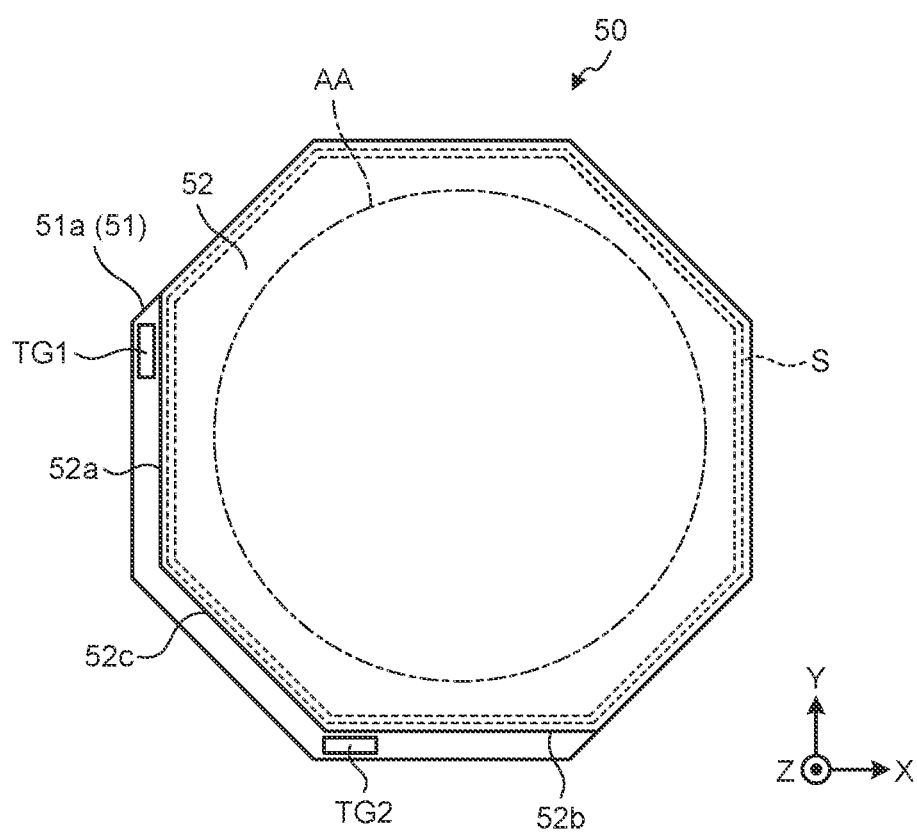
FIG. 3 is a plan view of a light adjustment panel.

FIG. 3 is a plan view of the light adjustment panel 50. FIG. 3 illustrates a light adjustment panel 50 positioned closest to the positive Z side among the plurality of light adjustment panels 50 illustrated in FIG. 2. The first substrate 51 and the second substrate 52 are each translucent and an octagon in plan view. The first substrate 51 includes an exposed portion 51a that is larger than the second substrate 52 in plan view and exposed outside the second substrate 52 in plan view.

The exposed portion 51a is a site of the first substrate 51 exposed outside a first side 52a on the negative X side the second substrate 52, a second side 52b on the negative Y side of the second substrate 52, and a third side 52c positioned between the first side 52a and the second side 52b. The exposed portion 51a may be exposed outside any other side of the second substrate 52 and may be exposed outside one side of the second substrate 52. The first substrate 51 and the second substrate 52 will be described later in detail.

The seal material S is annular in plan view and disposed on the entire circumference of a peripheral part of the second substrate 52.

As illustrated in FIG. 2, the liquid crystal layer 53 is positioned between the first substrate 51 and the second substrate 52. The liquid crystal layer 53 is positioned on the inner side of the seal material S. In each light adjustment panel 50, an effective region AA (FIG. 2) in which the degree of diffusion of light emitted from the light source 20 is adjustable overlaps the liquid crystal layer 53 in plan view.

The following describes the first substrate 51 and the second substrate 52 in detail.

Figure 4:
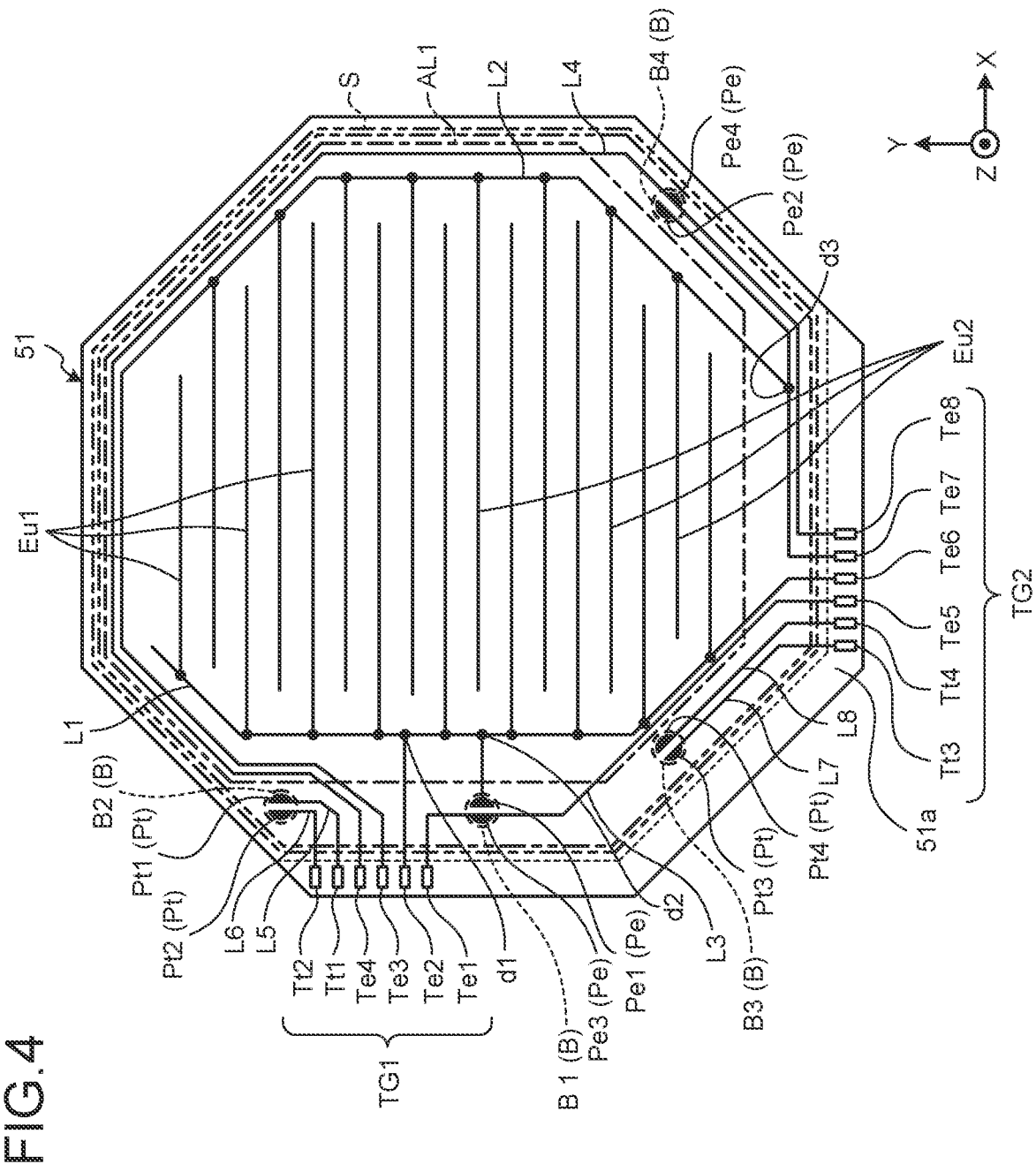
FIG. 4 is a plan view of a first substrate when viewed from the positive Z side.

FIG. 4 is a plan view of the first substrate 51 when viewed from the positive Z side. FIG. 4 illustrates the first substrate 51 of the light adjustment panel 50 positioned closest to the positive Z side among the plurality of light adjustment panels 50 illustrated in FIG. 2. The plate surface of the first substrate 51 illustrated in FIG. 4 is the front surface of the first substrate 51. A first terminal group TG1, a second terminal group TG2, a first U electrode Eu1, a second U electrode Eu2, a plurality of electrode pads Pe, a plurality of examination pads Pt, and a first alignment film AL1 are disposed on the front surface of the first substrate 51.

The first terminal group TG1 and the second terminal group TG2 are positioned on the outer side of the seal material S on the front surface of the first substrate 51. The first U electrode Eu1, the second U electrode Eu2, the plurality of electrode pads Pe, the plurality of examination pads Pt, and the first alignment film AL1 are positioned on the inner side of the seal material S on the front surface of the first substrate 51. In plan view, the first alignment film AL1 may overlap the seal material S or protrude outside the seal material S.

The first terminal group TG1 is disposed on the negative X side at the exposed portion 51a. The first terminal group TG1 includes a first electrode terminal Te1, a second electrode terminal Te2, a third electrode terminal Te3, a fourth electrode terminal Te4, a first examination terminal Tt1, and a second examination terminal Tt2. The first electrode terminal Te1, the second electrode terminal Te2, the third electrode terminal Te3, the fourth electrode terminal Te4, the first examination terminal Tt1, and the second examination terminal Tt2 are arranged in the stated order from the negative Y side to the positive Y side in the Y direction.

The second terminal group TG2 is disposed on the negative Y side at the exposed portion 51a. In this manner, the first terminal group TG1 and the second terminal group TG2 are disposed at positions different from each other with respect to the center of the first substrate 51 in plan view.

The second terminal group TG2 includes a third examination terminal Tt3, a fourth examination terminal Tt4, a fifth electrode terminal Te5, a sixth electrode terminal Te6, a seventh electrode terminal Te7, and an eighth electrode terminal Te8. The third examination terminal Tt3, the fourth examination terminal Tt4, the fifth electrode terminal Te5, the sixth electrode terminal Te6, the seventh electrode terminal Te7, and the eighth electrode terminal Te8 are arranged in the stated order from the negative X side to the positive X side in the X direction.

The first U electrode Eu1 is a bar-shaped electrode extending in the X direction, and a plurality of the first U electrodes Eu1 are arranged in the Y direction. The plurality of first U electrodes Eu1 are each electrically coupled to a first wire L1 at an end on the negative X side.

The first wire L1 extends from the positive Y side to the negative Y side on the negative X side of the first substrate 51 and is electrically coupled to the sixth electrode terminal Te6. The first wire L1 is bifurcated at a first bifurcation point d1 and electrically coupled to the second electrode terminal Te2. Accordingly, the second electrode terminal Te2 and the sixth electrode terminal Te6 are electrically coupled to the first U electrodes Eu1 through the first wire L1.

The second U electrode Eu2 is a bar-shaped electrode extending in the X direction, and a plurality of the second U electrodes Eu2 are arranged in the Y direction. The first U electrodes Eu1 and the second U electrodes Eu2 are alternately arranged in the Y direction. The plurality of second U electrodes Eu2 are each electrically coupled to a second wire L2 at an end on the positive X side.

The second wire L2 electrically couples the third electrode terminal Te3 and the seventh electrode terminal Te7 and extends along the periphery of the first substrate 51. Accordingly, the third electrode terminal Te3 and the seventh electrode terminal Te7 are electrically coupled to the second U electrodes Eu2 through the second wire L2.

The plurality of electrode pads Pe and the plurality of examination pads Pt each have conductivity and a semicircular shape in plan view. The electrode pads Pe and the examination pads Pt are not limited to a semicircular shape in plan view but may have, for example, a circular shape or a rectangular shape in plan view. The number of the electrode pads Pe and the number of the examination pads Pt disposed on the first substrate 51 are each four but not limited to four.

The plurality of electrode pads Pe disposed on the first substrate 51 are a first electrode pad Pe1, a second electrode pad Pe2, a third electrode pad Pe3, and a fourth electrode pad Pe4. The first electrode pad Pe1 and the third electrode pad Pe3 are adjacent to each other, and the second electrode pad Pe2 and the fourth electrode pad Pe4 are adjacent to each other. The plurality of electrode pads Pe are simply referred to as "electrode pads Pe" when described without distinction from one another.

The first electrode pad Pe1 is electrically coupled to the first wire L1 extending from a second bifurcation point d2. Accordingly, the first electrode pad Pe1 is electrically coupled to the first U electrodes Eu1. The first electrode pad Pe1 is also electrically coupled to each of the second electrode terminal Te2 and the sixth electrode terminal Te6.

The second electrode pad Pe2 is electrically coupled to the second wire L2 extending from a third bifurcation point d3. Accordingly, the second electrode pad Pe2 is electrically coupled to the second U electrodes Eu2. The second electrode pad Pe2 is also electrically coupled to each of the third electrode terminal Te3 and the seventh electrode terminal Te7.

The third electrode pad Pe3 is disposed on a third wire L3 electrically coupling the first electrode terminal Te1 and the fifth electrode terminal Te5. In other words, the fifth electrode terminal Te5 is electrically coupled to the first electrode terminal Te1 through the third electrode pad Pe3.

The fourth electrode pad Pe4 is disposed on a fourth wire L4 electrically coupling the fourth electrode terminal Te4 and the eighth electrode terminal Te8 on the outer side of the second wire L2. In other words, the eighth electrode terminal Te8 is electrically coupled to the fourth electrode terminal Te4 through the fourth electrode pad Pe4.

The plurality of examination pads Pt disposed on the first substrate 51 are a first examination pad Pt1, a second examination pad Pt2, a third examination pad Pt3, and a fourth examination pad Pt4. The first examination pad Pt1 and the second examination pad Pt2 are adjacent to each other, and the third examination pad Pt3 and the fourth examination pad Pt4 are adjacent to each other. The plurality of examination pads Pt are simply referred to as "examination pads Pt" when described without distinction from one another.

The first examination pad Pt1 is electrically coupled to the first examination terminal Tt1 through a fifth wire L5.

The second examination pad Pt2 is electrically coupled to the second examination terminal Tt2 through a sixth wire L6.

The third examination pad Pt3 is electrically coupled to the third examination terminal Tt3 through a seventh wire L7.

The fourth examination pad Pt4 is electrically coupled to the fourth examination terminal Tt4 through an eighth wire L8.

The first alignment film AL1 is disposed at a position overlapping the first U electrodes Eu1 and the second U electrodes Eu2 in plan view. The first U electrodes Eu1 and the second U electrodes Eu2 are positioned between the front surface of the first substrate 51 and the first alignment film AL1. The first alignment film AL1 is disposed at a position not overlapping the first terminal group TG1, the second terminal group TG2, the plurality of electrode pads Pe, and the plurality of examination pads Pt in plan view. The orientation of liquid crystal molecules in the first alignment film AL1 is aligned with the Y direction.

Figure 5:
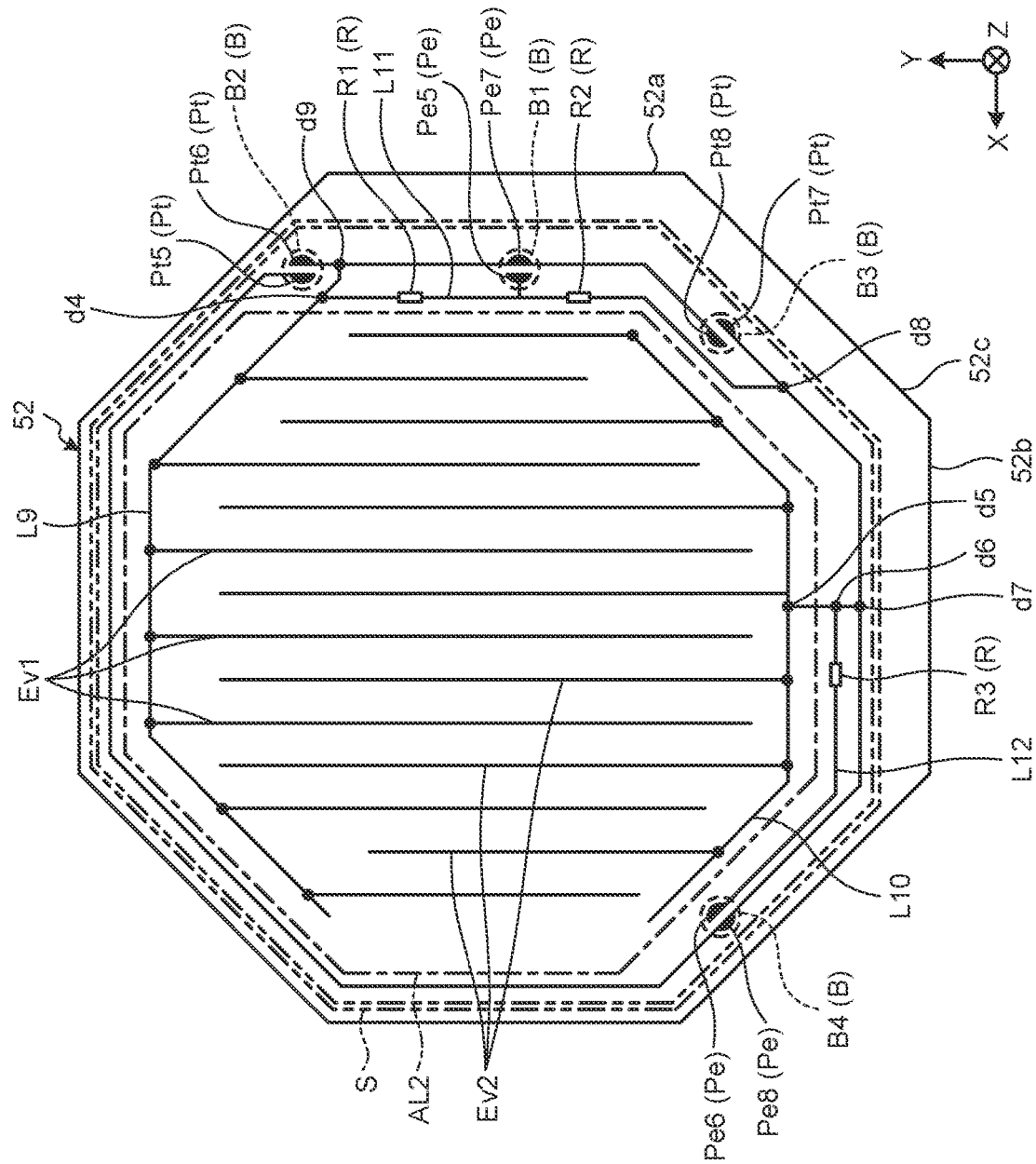
FIG. 5 is a plan view of a second substrate when viewed from the negative Z side.

FIG. 5 is a plan view of the second substrate 52 when viewed from the negative Z side. FIG. 5 illustrates the second substrate 52 of the light adjustment panel 50 positioned closest to the positive Z side among the plurality of light adjustment panels 50 illustrated in FIG. 2. The plate surface of the second substrate 52 illustrated in FIG. 5 is the back surface of the second substrate 52. The back surface of the second substrate 52 faces the front surface of the first substrate 51. A first V electrode Ev1, a second V electrode Ev2, a plurality of discharge resistors R, a plurality of electrode pads Pe, a plurality of examination pads Pt, and a second alignment film AL2 are disposed on the back surface of the second substrate 52.

The first V electrode Ev1, the second V electrode Ev2, the plurality of discharge resistors R, the plurality of electrode pads Pe, the plurality of examination pads Pt, and the second alignment film AL2 are positioned on the inner side of the seal material S on the back surface of the second substrate 52. In plan view, the second alignment film AL2 may overlap the seal material S or protrude outside the seal material S.

The first V electrode Ev1 is a bar-shaped electrode extending in the Y direction, and a plurality of the first V electrodes Ev1 are arranged in the X direction. The plurality of first V electrodes Ev1 are each electrically coupled to a ninth wire L9 at an end on the positive Y side. The ninth wire L9 extends from the negative X side to the positive X side on the positive Y side of the second substrate 52.

The second V electrode Ev2 is a bar-shaped electrode extending in the Y direction, and a plurality of the second V electrodes Ev2 are arranged in the X direction. The first V electrodes Ev1 and the second V electrodes Ev2 are alternately arranged in the X direction. The plurality of second V electrodes Ev2 are each electrically coupled to a tenth wire L10 at an end on the negative Y side. The tenth wire L10 extends from the negative X side to the positive X side on the negative Y side of the second substrate 52.

The plurality of discharge resistors R are each a resistor having a predetermined electric resistance value. The predetermined electric resistance value is a relatively high value and has extremely low influence on operation of the light adjustment panel 50. The predetermined electric resistance value is measured and determined by, for example, an experiment performed in advance.

The plurality of discharge resistors R are disposed on the second substrate 52. This can improve the freedom of arrangement of the first substrate 51. The number of the plurality of discharge resistors R is three but not limited to three. The plurality of discharge resistors R include a first discharge resistor R1, a second discharge resistor R2, and a third discharge resistor R3 and have the same configuration. The first discharge resistor R1, the second discharge resistor R2, and the third discharge resistor R3 are simply referred to as "discharge resistors R" when described without distinction.

Figure 6:
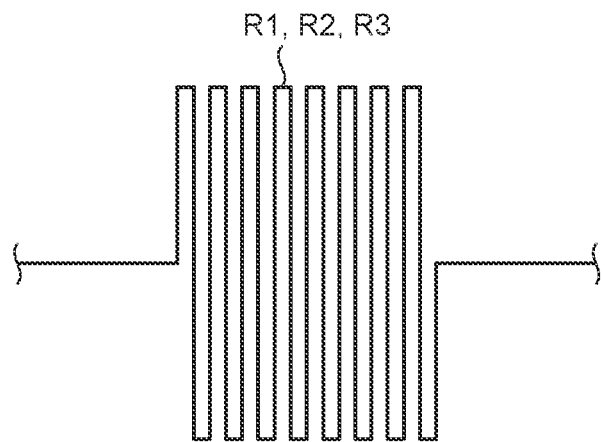
FIG. 6 is an enlarged view of a discharge resistor.

FIG. 6 is an enlarged view of each discharge resistor R. The discharge resistor R is formed by disposing a conductive wire in a meandering manner. Accordingly, the discharge resistor R has a relatively simple shape, which leads to cost reduction of the discharge resistor R as well as the electrooptical device 30 and the illumination device 1.

The plurality of electrode pads Pe and the plurality of examination pads Pt disposed on the second substrate 52 illustrated in FIG. 5 are formed in a similar manner to the electrode pads Pe and the examination pads Pt disposed on the first substrate 51.

The number of the electrode pads Pe disposed on the second substrate 52 is equal to the number of the electrode pads Pe disposed on the first substrate 51. The number of the examination pads Pt disposed on the second substrate 52 is equal to the number of the examination pads Pt disposed on the first substrate 51.

The plurality of electrode pads Pe disposed on the second substrate 52 are a fifth electrode pad Pe5, a sixth electrode pad Pe6, a seventh electrode pad Pe7, and an eighth electrode pad Pe8. The fifth electrode pad Pe5 and the seventh electrode pad Pe7 are adjacent to each other, and the sixth electrode pad Pe6 and the eighth electrode pad Pe8 are adjacent to each other.

The fifth electrode pad Pe5 overlaps the first electrode pad Pe1 disposed on the first substrate 51 in plan view. Accordingly, the fifth electrode pad Pe5 and the first electrode pad Pe1 face each other. The fifth electrode pad Pe5 is electrically coupled to each of the first discharge resistor R1 and the second discharge resistor R2 through an eleventh wire L11.

The eleventh wire L11 is electrically coupled to the ninth wire L9 extending from a fourth bifurcation point d4 through the first discharge resistor R1. Accordingly, the fifth electrode pad Pe5 is electrically coupled to the first V electrodes Ev1 through the first discharge resistor R1.

The eleventh wire L11 is also electrically coupled to the tenth wire L10 extending from an eighth bifurcation point d8 via a fifth bifurcation point d5, a sixth bifurcation point d6, and a seventh bifurcation point d7 through the second discharge resistor R2. Accordingly, the fifth electrode pad Pe5 is electrically coupled to the second V electrodes Ev2 through the second discharge resistor R2. The first V electrodes Ev1 are electrically coupled to the second V electrodes Ev2 through the first discharge resistor R1 and the second discharge resistor R2.

The sixth electrode pad Pe6 overlaps the second electrode pad Pe2 disposed on the first substrate 51 in plan view. Accordingly, the sixth electrode pad Pe6 and the second electrode pad Pe2 face each other. The sixth electrode pad Pe6 is electrically coupled to the third discharge resistor R3 through a twelfth wire L12.

The twelfth wire L12 is electrically coupled to the tenth wire L10 extending from the sixth bifurcation point d6 through the third discharge resistor R3. Accordingly, the sixth electrode pad Pe6 is electrically coupled to the second V electrodes Ev2 through the third discharge resistor R3. The sixth electrode pad Pe6 is also electrically coupled to the fifth electrode pad Pe5 through the third discharge resistor R3 and the second discharge resistor R2.

In addition, the sixth electrode pad Pe6 is electrically coupled to the first V electrodes Ev1 through the twelfth wire L12, the third discharge resistor R3, the tenth wire L10, the second discharge resistor R2, the eleventh wire L11, the first discharge resistor R1, and the ninth wire L9. Accordingly, the sixth electrode pad Pe6 is electrically coupled to the first V electrodes Ev1 through the plurality of discharge resistors R.

The seventh electrode pad Pe7 overlaps the third electrode pad Pe3 disposed on the first substrate 51 in plan view. Accordingly, the seventh electrode pad Pe7 and the third electrode pad Pe3 face each other. The seventh electrode pad Pe7 is electrically coupled to the first V electrodes Ev1 through the ninth wire L9 extending from a ninth bifurcation point d9.

The eighth electrode pad Pe8 overlaps the fourth electrode pad Pe4 disposed on the first substrate 51 in plan view. Accordingly, the eighth electrode pad Pe8 and the fourth electrode pad Pe4 face each other. The eighth electrode pad Pe8 is electrically coupled to the second V electrodes Ev2 through the tenth wire L10 extending from the seventh bifurcation point d7.

The plurality of examination pads Pt disposed on the second substrate 52 are a fifth examination pad Pt5, a sixth examination pad Pt6, a seventh examination pad Pt7, and an eighth examination pad Pt8. The fifth examination pad Pt5 and the sixth examination pad Pt6 are adjacent to each other, and the seventh examination pad Pt7 and the eighth examination pad Pt8 are adjacent to each other.

The fifth examination pad Pt5 overlaps the first examination pad Pt1 disposed on the first substrate 51 in plan view. Accordingly, the fifth examination pad Pt5 and the first examination pad Pt1 face each other. The fifth examination pad Pt5 is electrically coupled to the eighth electrode pad Pe8 through the tenth wire L10 further extending from the eighth electrode pad Pe8.

The sixth examination pad Pt6 overlaps the second examination pad Pt2 disposed on the first substrate 51 in plan view. Accordingly, the sixth examination pad Pt6 and the second examination pad Pt2 face each other. The sixth examination pad Pt6 is electrically coupled to the seventh electrode pad Pe7 through the ninth wire L9 extending from the ninth bifurcation point d9.

The seventh examination pad Pt7 overlaps the third examination pad Pt3 disposed on the first substrate 51 in plan view. Accordingly, the seventh examination pad Pt7 and the third examination pad Pt3 face each other. The seventh examination pad Pt7 is electrically coupled to the eighth electrode pad Pe8 through the tenth wire L10 extending from the eighth bifurcation point d8. In other words, the seventh examination pad Pt7 is electrically coupled to the fifth examination pad Pt5 through the eighth electrode pad Pe8.

The eighth examination pad Pt8 overlaps the fourth examination pad Pt4 disposed on the first substrate 51 in plan view. Accordingly, the eighth examination pad Pt8 and the fourth examination pad Pt4 face each other. The eighth examination pad Pt8 is electrically coupled to the seventh electrode pad Pe7 through the ninth wire L9 further extending from the seventh electrode pad Pe7. In other words, the eighth examination pad Pt8 is electrically coupled to the sixth examination pad Pt6 through the seventh electrode pad Pe7.

The second alignment film AL2 is disposed at a position overlapping the first V electrodes Ev1 and the second V electrodes Ev2 in plan view. The first V electrodes Ev1 and the second V electrodes Ev2 are positioned between the back surface of the second substrate 52 and the second alignment film AL2. The second alignment film AL2 is disposed at a position not overlapping the plurality of discharge resistors R, the plurality of electrode pads Pe, and the plurality of examination pads Pt in plan view. The orientation of liquid crystal molecules in the second alignment film AL2 is orthogonal to the orientation of the first alignment film AL1 and aligned with the X direction.

Figure 7:
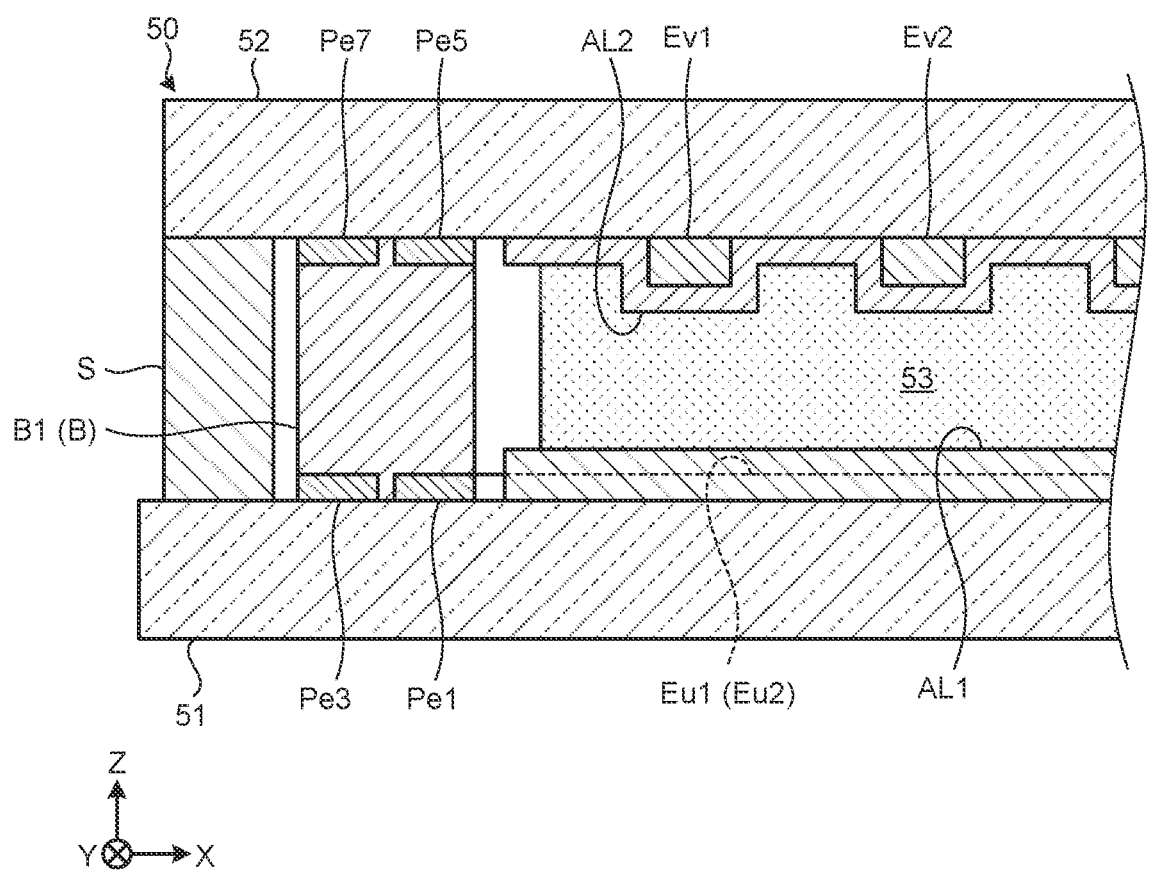
FIG. 7 is an enlarged sectional view of the light adjustment panel.

FIG. 7 is an enlarged sectional view of each light adjustment panel 50. The liquid crystal layer 53 is disposed between the first alignment film AL1 and the second alignment film AL2. The orientation of the first alignment film AL1 and the orientation of the second alignment film AL2 are orthogonal to each other in plan view as described above. Accordingly, the orientation of liquid crystal molecules in the liquid crystal layer 53 is twisted by 90° about the Z direction.

FIG. 7 illustrates a set of the first electrode pad Pe1, the third electrode pad Pe3, the fifth electrode pad Pe5, and the seventh electrode pad Pe7 among the plurality of electrode pads Pe. A set of the second electrode pad Pe2, the fourth electrode pad Pe4, the sixth electrode pad Pe6, and the eighth electrode pad Pe8 is disposed in the same manner as the set of a plurality of electrode pads Pe illustrated in FIG. 7. A set of the first examination pad Pt1, the second examination pad Pt2, the fifth examination pad Pt5, and the sixth examination pad Pt6 is disposed in the same manner as the set of a plurality of electrode pads Pe illustrated in FIG. 7. A set of the third examination pad Pt3, the fourth examination pad Pt4, the seventh examination pad Pt7, and the eighth examination pad Pt8 is disposed in the same manner as the set of a plurality of electrode pads Pe illustrated in FIG. 7. As described above, the first alignment film AL1 and the second alignment film AL2 are not disposed on the plurality of electrode pads Pe and the plurality of examination pads Pt.

As illustrated in FIGS. 4, 5, and 7, the light adjustment panel 50 further includes coupling members B. The coupling members B electrically couple the first substrate 51 and the second substrate 52. Specifically, the coupling members B electrically couple electrode pads Pe facing each other and examination pads Pt facing each other. The coupling members B are what are called anisotropic conductive films or anisotropic conductive bonding agents.

Each coupling member B contains conductive particles in an insulating base member made of, for example, resin. When sandwiched between two members facing each other in the Z direction, the coupling member B exerts conductivity in the Z direction and electrically couples the two members. In addition, the coupling member B has such anisotropy that the coupling member B does not exert conductivity in directions orthogonal to the Z direction.

As illustrated in FIG. 7, the set of the first electrode pad Pe1, the third electrode pad Pe3, the fifth electrode pad Pe5, and the seventh electrode pad Pe7 sandwiches a first coupling member B1 in the Z direction. As illustrated in FIGS. 4 and 5, the first electrode pad Pe1, the third electrode pad Pe3, the fifth electrode pad Pe5, and the seventh electrode pad Pe7 overlap the first coupling member B1 in plan view.

As described above, the first electrode pad Pe1 and the fifth electrode pad Pe5 face each other in the Z direction, and the third electrode pad Pe3 and the seventh electrode pad Pe7 face each other in the Z direction. Accordingly, the first coupling member B1 electrically couples the first electrode pad Pe1 and the fifth electrode pad Pe5 and electrically couples the third electrode pad Pe3 and the seventh electrode pad Pe7. However, the first coupling member B1 does not electrically couple the first electrode pad Pe1 and each of the third electrode pad Pe3 and the seventh electrode pad Pe7. Moreover, the first coupling member B1 does not electrically couple the third electrode pad Pe3 and each of the first electrode pad Pe1 and the fifth electrode pad Pe5.

Similarly, the set of the first examination pad Pt1, the second examination pad Pt2, the fifth examination pad Pt5, and the sixth examination pad Pt6 sandwiches a second coupling member B2 in the Z direction. As illustrated in FIGS. 4 and 5, the first examination pad Pt1, the second examination pad Pt2, the fifth examination pad Pt5, and the sixth examination pad Pt6 overlap the second coupling member B2 in plan view.

The first examination pad Pt1 and the fifth examination pad Pt5 face each other in the Z direction, and the second examination pad Pt2 and the sixth examination pad Pt6 face each other in the Z direction. Accordingly, the second coupling member B2 electrically couples the first examination pad Pt1 and the fifth examination pad Pt5 and electrically couples the second examination pad Pt2 and the sixth examination pad Pt6. However, the second coupling member B2 does not electrically couple the first examination pad Pt1 and each of the second examination pad Pt2 and the sixth examination pad Pt6. Moreover, the second coupling member B2 does not electrically couple the second examination pad Pt2 and each of the first examination pad Pt1 and the fifth examination pad Pt5.

Similarly, the set of the third examination pad Pt3, the fourth examination pad Pt4, the seventh examination pad Pt7, and the eighth examination pad Pt8 sandwiches a third coupling member B3 in the Z direction. As illustrated in FIGS. 4 and 5, the third examination pad Pt3, the fourth examination pad Pt4, the seventh examination pad Pt7, and the eighth examination pad Pt8 overlap the third coupling member B3 in plan view.

The third examination pad Pt3 and the seventh examination pad Pt7 face each other in the Z direction, and the fourth examination pad Pt4 and the eighth examination pad Pt8 face each other in the Z direction. Accordingly, the third coupling member B3 electrically couples the third examination pad Pt3 and the seventh examination pad Pt7 and electrically couples the fourth examination pad Pt4 and the eighth examination pad Pt8. However, the second coupling member B2 does not electrically couple the third examination pad Pt3 and each of the fourth examination pad Pt4 and the eighth examination pad Pt8. Moreover, the third coupling member B3 does not electrically couple the fourth examination pad Pt4 and each of the third examination pad Pt3 and the seventh examination pad Pt7.

Similarly, the set of the second electrode pad Pe2, the fourth electrode pad Pe4, the sixth electrode pad Pe6, and the eighth electrode pad Pe8 sandwiches a fourth coupling member B4 in the Z direction. Accordingly, as illustrated in FIGS. 4 and 5, the second electrode pad Pe2, the fourth electrode pad Pe4, the sixth electrode pad Pe6, and the eighth electrode pad Pe8 overlap the fourth coupling member B4 in plan view.

The second electrode pad Pe2 and the sixth electrode pad Pe6 face each other in the Z direction, and the fourth electrode pad Pe4 and the eighth electrode pad Pe8 face each other in the Z direction. Accordingly, the fourth coupling member B4 electrically couples the second electrode pad Pe2 and the sixth electrode pad Pe6 and electrically couples the fourth electrode pad Pe4 and the eighth electrode pad Pe8. However, the fourth coupling member B4 does not electrically couple the second electrode pad Pe2 and each of the fourth electrode pad Pe4 and the eighth electrode pad Pe8. Moreover, the fourth coupling member B4 does not electrically couple the fourth electrode pad Pe4 and each of the second electrode pad Pe2 and the sixth electrode pad Pe6. The first coupling member B1, the second coupling member B2, the third coupling member B3, and the fourth coupling member B4 are simply referred to as "coupling members B" when described without distinction from one another.

Since each light adjustment panel 50 has such a configuration, the first U electrodes Eu1 are electrically coupled to the fifth electrode pad Pe5 through the first wire L1, the first electrode pad Pe1, and the first coupling member B1. As described above, the fifth electrode pad Pe5 is electrically coupled to the first V electrodes Ev1 through the first discharge resistor R1. Thus, the first U electrodes Eu1 are electrically coupled to the first V electrodes Ev1 through the first discharge resistor R1.

As described above, the fifth electrode pad Pe5 is also electrically coupled to the second V electrodes Ev2 through the second discharge resistor R2. Thus, the first U electrodes Eu1 are electrically coupled to the second V electrodes Ev2 through the second discharge resistor R2.

As described above, the fifth electrode pad Pe5 is also electrically coupled to the sixth electrode pad Pe6 through the second discharge resistor R2 and the third discharge resistor R3. The sixth electrode pad Pe6 is electrically coupled to the second U electrodes Eu2 through the fourth coupling member B4, the second electrode pad Pe2, and the second wire L2. Thus, the first U electrodes Eu1 are electrically coupled to the second U electrodes Eu2 through the second discharge resistor R2 and the third discharge resistor R3.

As described above, the second U electrodes Eu2 are electrically coupled to the sixth electrode pad Pe6. As described above, the sixth electrode pad Pe6 is electrically coupled to the first V electrodes Ev1 through the plurality of discharge resistors R (the first discharge resistor R1, the second discharge resistor R2, and the third discharge resistor R3). Thus, the second U electrodes Eu2 are electrically coupled to the first V electrodes Ev1 through the first discharge resistor R1, the second discharge resistor R2, and the third discharge resistor R3.

The sixth electrode pad Pe6 is also electrically coupled to the second V electrodes Ev2 through the third discharge resistor R3. Thus, the second U electrodes Eu2 are electrically coupled to the second V electrodes Ev2 through the third discharge resistor R3.

The first V electrodes Ev1 are electrically coupled to the second V electrodes Ev2 through the first discharge resistor R1 and the second discharge resistor R2 as described above. Accordingly, two kinds of electrodes among the first U electrodes Eu1, the second U electrodes Eu2, the first V electrodes Ev1, and the second V electrodes Ev2 are electrically coupled to each other through the discharge resistors R.

In each light adjustment panel 50 thus configured, two electrode terminals among the first electrode terminal Te1, the second electrode terminal Te2, the third electrode terminal Te3, and the fourth electrode terminal Te4 included in the first terminal group TG1 are electrically coupled to each other through the discharge resistors R.

Specifically, the first electrode terminal Te1 is electrically coupled to the second electrode terminal Te2 through the third wire L3, the third electrode pad Pe3, the first coupling member B1, the seventh electrode pad Pe7, the ninth wire L9, the first discharge resistor R1, the eleventh wire L11, the fifth electrode pad Pe5, the first coupling member B1, the first electrode pad Pe1, and the first wire L1. Accordingly, the first electrode terminal Te1 is electrically coupled to the second electrode terminal Te2 through the first discharge resistor R1.

The first electrode terminal Te1 is also electrically coupled to the third electrode terminal Te3 through the third wire L3, the third electrode pad Pe3, the first coupling member B1, the seventh electrode pad Pe7, the ninth wire L9, the first discharge resistor R1, the eleventh wire L11, the second discharge resistor R2, the tenth wire L10, the third discharge resistor R3, the twelfth wire L12, the sixth electrode pad Pe6, the fourth coupling member B4, the second electrode pad Pe2, and the second wire L2. Accordingly, the first electrode terminal Te1 is coupled to the third electrode terminal Te3 through the first discharge resistor R1, the second discharge resistor R2, and the third discharge resistor R3.

The first electrode terminal Te1 is also electrically coupled to the fourth electrode terminal Te4 through the third wire L3, the third electrode pad Pe3, the first coupling member B1, the seventh electrode pad Pe7, the ninth wire L9, the first discharge resistor R1, the eleventh wire L11, the second discharge resistor R2, the tenth wire L10, the eighth electrode pad Pe8, the fourth coupling member B4, the fourth electrode pad Pe4, and the fourth wire L4. Accordingly, the first electrode terminal Te1 is electrically coupled to the fourth electrode terminal Te4 through the first discharge resistor R1 and the second discharge resistor R2.

The second electrode terminal Te2 is electrically coupled to the third electrode terminal Te3 through the first wire L1, the first electrode pad Pe1, the first coupling member B1, the fifth electrode pad Pe5, the eleventh wire L11, the second discharge resistor R2, the tenth wire L10, the third discharge resistor R3, the twelfth wire L12, the sixth electrode pad Pe6, the fourth coupling member B4, the second electrode pad Pe2, and the second wire L2. Accordingly, the second electrode terminal Te2 is electrically coupled to the third electrode terminal Te3 through the second discharge resistor R2 and the third discharge resistor R3.

The second electrode terminal Te2 is also electrically coupled to the fourth electrode terminal Te4 through the first wire L1, the first electrode pad Pe1, the first coupling member B1, the fifth electrode pad Pe5, the eleventh wire L11, the second discharge resistor R2, the tenth wire L10, the eighth electrode pad Pe8, the fourth coupling member B4, the fourth electrode pad Pe4, and the fourth wire L4. Accordingly, the second electrode terminal Te2 is electrically coupled to the fourth electrode terminal Te4 through the second discharge resistor R2.

The third electrode terminal Te3 is also electrically coupled to the fourth electrode terminal Te4 through the second wire L2, the second electrode pad Pe2, the fourth coupling member B4, the sixth electrode pad Pe6, the twelfth wire L12, the third discharge resistor R3, the tenth wire L10, the eighth electrode pad Pe8, the fourth coupling member B4, the fourth electrode pad Pe4, and the fourth wire L4. Accordingly, the third electrode terminal Te3 is electrically coupled to the fourth electrode terminal Te4 through the third discharge resistor R3.

In each light adjustment panel 50 thus configured, two kinds of electrode terminals among the fifth electrode terminal Te5, the sixth electrode terminal Te6, the seventh electrode terminal Te7, and the eighth electrode terminal Te8 included in the second terminal group TG2 are electrically coupled to each other through the discharge resistors R.

As described above, the fifth electrode terminal Te5 is electrically coupled to the first electrode terminal Te1 through the third electrode pad Pe3. The sixth electrode terminal Te6 is coupled to the second electrode terminal Te2 through the first wire L1 electrically coupled to the first electrode pad Pe1. The seventh electrode terminal Te7 is coupled to the third electrode terminal Te3 through the second wire L2 electrically coupled to the second electrode pad Pe2. The eighth electrode terminal Te8 is electrically coupled to the fourth electrode terminal Te4 through the fourth electrode pad Pe4.

Accordingly, the relation of electric coupling among the fifth electrode terminal Te5, the sixth electrode terminal Te6, the seventh electrode terminal Te7, and the eighth electrode terminal Te8 corresponds to the relation of electric coupling among the first electrode terminal Te1, the second electrode terminal Te2, the third electrode terminal Te3, and the fourth electrode terminal Te4 described above.

Thus, the fifth electrode terminal Te5 is electrically coupled to the sixth electrode terminal Te6 through the first discharge resistor R1. The fifth electrode terminal Te5 is also coupled to the seventh electrode terminal Te7 through the first discharge resistor R1, the second discharge resistor R2, and the third discharge resistor R3. The fifth electrode terminal Te5 is also electrically coupled to the eighth electrode terminal Te8 through the first discharge resistor R1 and the second discharge resistor R2.

The sixth electrode terminal Te6 is electrically coupled to the seventh electrode terminal Te7 through the second discharge resistor R2 and the third discharge resistor R3. The sixth electrode terminal Te6 is also electrically coupled to the eighth electrode terminal Te8 through the second discharge resistor R2. The seventh electrode terminal Te7 is also electrically coupled to the eighth electrode terminal Te8 through the third discharge resistor R3.

When applying voltage to the first U electrodes Eu1 in each light adjustment panel 50 thus configured, the control device 40 applies the voltage to one of the second electrode terminal Te2 and the sixth electrode terminal Te6. In this case, the voltage is applied from one of the second electrode terminal Te2 and the sixth electrode terminal Te6 to the first U electrodes Eu1 through the first wire L1.

When applying voltage to the second U electrodes Eu2, the control device 40 applies the voltage to one of the third electrode terminal Te3 and the seventh electrode terminal Te7. In this case, the voltage is applied from one of the third electrode terminal Te3 and the seventh electrode terminal Te7 to the second U electrodes Eu2 through the second wire L2.

When applying voltage to the first V electrodes Ev1, the control device 40 applies voltage to one of the first electrode terminal Te1 and the fifth electrode terminal Te5. In this case, the voltage is applied from one of the first electrode terminal Te1 and the fifth electrode terminal Te5 to the first V electrodes Ev1 through the third wire L3, the third electrode pad Pe3, the first coupling member B1, the seventh electrode pad Pe7, and the ninth wire L9. In this manner, the voltage is applied to the first V electrodes Ev1 through the first coupling member B1 electrically coupling the third electrode pad Pe3 disposed on the first substrate 51 and the seventh electrode pad Pe7 disposed on the second substrate 52.

When applying voltage to the second V electrodes Ev2, the control device 40 applies the voltage to one of the fourth electrode terminal Te4 and the eighth electrode terminal Te8. In this case, the voltage is applied from one of the fourth electrode terminal Te4 and the eighth electrode terminal Te8 to the second V electrodes Ev2 through the fourth wire L4, the fourth electrode pad Pe4, the fourth coupling member B4, the eighth electrode pad Pe8, and the twelfth wire L12. In this manner, the voltage is applied to the second V electrodes Ev2 through the fourth coupling member B4 electrically coupling the fourth electrode pad Pe4 disposed on the first substrate 51 and the eighth electrode pad Pe8 disposed on the second substrate 52.

The following describes operation of each light adjustment panel 50.

In a state in which no voltage is applied to the first U electrodes Eu1, the second U electrodes Eu2, the first V electrodes Ev1, and the second V electrodes Ev2, no electric field is generated between the first U electrodes Eu1 and the second U electrodes Eu2 and between the first V electrodes Ev1 and the second V electrodes Ev2 and the orientation of liquid crystal molecules in the liquid crystal layer 53 is regulated by the first alignment film AL1 and the second alignment film AL2 orthogonal to each other. In this case, the polarization components of light transmitting through the liquid crystal layer 53 are rotated by 90° about the Z direction.

In a state in which voltage is applied to the first U electrodes Eu1 and the second U electrodes Eu2, electric field is generated between the first U electrodes Eu1 and the second U electrodes Eu2. Accordingly, the orientation of liquid crystal molecules changes, and distribution of the refractive index of the liquid crystal layer 53 in a direction (the Y direction) orthogonal to the first U electrodes Eu1 and the second U electrodes Eu2 changes. The Y-directional polarization component of light transmitting through the liquid crystal layer 53 in this state is diffused in the Y direction.

In a state in which voltage is applied to the first V electrodes Ev1 and the second V electrodes Ev2, electric field is generated between the first V electrodes Ev1 and the second V electrodes Ev2. Accordingly, the orientation of liquid crystal molecules changes, and distribution of the refractive index of the liquid crystal layer 53 in a direction (the X direction) orthogonal to the first V electrodes Ev1 and the second V electrodes Ev2 changes. The X-directional polarization component of light transmitting through the liquid crystal layer 53 in this state is diffused in the X direction.

The following describes disposition of the plurality of light adjustment panels 50 in detail. As illustrated in FIG. 2, the plurality of light adjustment panels 50 are stacked in orientations different from one another about the Z direction. In each of the plurality of light adjustment panels 50, one of the first terminal group TG1 and the second terminal group TG2 is electrically coupled to the control device 40 through a flexible printed circuit (FPC) 70 in accordance with the orientation of the light adjustment panel 50 about the Z direction.

Specifically, the four light adjustment panels 50 illustrated in FIG. 2 are a first light adjustment panel 50A, a second light adjustment panel 50B, a third light adjustment panel 50C, and a fourth light adjustment panel 50D that are stacked in order from the negative Z side to the positive Z side. In the following description, the first light adjustment panel 50A, the second light adjustment panel 50B, the third light adjustment panel 50C, and the fourth light adjustment panel 50D are simply referred to as "light adjustment panels 50" when described without distinction.

The first light adjustment panel 50A is disposed in such a state that the second terminal group TG2 is positioned on the positive X side. In the first light adjustment panel 50A, the flexible printed circuit 70 is electrically coupled to the second terminal group TG2, the first U electrodes Eu1 and the second U electrodes Eu2 extend in the Y direction, and the first V electrodes Ev1 and the second V electrodes Ev2 extend in the X direction.

The second light adjustment panel 50B is disposed in such a state that the second terminal group TG2 is positioned on the negative X side. In the second light adjustment panel 50B, the flexible printed circuit 70 is electrically coupled to the second terminal group TG2, the first U electrodes Eu1 and the second U electrodes Eu2 extend in the Y direction, and the first V electrodes Ev1 and the second V electrodes Ev2 extend in the X direction.

The third light adjustment panel 50C is disposed in such a state that the first terminal group TG1 is positioned on the positive X side. In the third light adjustment panel 50C, the flexible printed circuit 70 is electrically coupled to the first terminal group TG1, the first U electrodes Eu1 and the second U electrodes Eu2 extend in the X direction, and the first V electrodes Ev1 and the second V electrodes Ev2 extend in the Y direction.

The fourth light adjustment panel 50D is disposed in such a state that the first terminal group TG1 is positioned on the negative X side. In the fourth light adjustment panel 50D, the flexible printed circuit 70 is electrically coupled to the first terminal group TG1, the first U electrodes Eu1 and the second U electrodes Eu2 extend in the X direction, and the first V electrodes Ev1 and the second V electrodes Ev2 extend in the Y direction.

When the flexible printed circuit 70 is electrically coupled to the first terminal group TG1, voltage is applied to the first U electrodes Eu1, the second U electrodes Eu2, the first V electrodes Ev1, and the second V electrodes Ev2 through the first electrode terminal Te1, the second electrode terminal Te2, the third electrode terminal Te3, and the fourth electrode terminal Te4. When the flexible printed circuit 70 is electrically coupled to the second terminal group TG2, voltage is applied to the first U electrodes Eu1, the second U electrodes Eu2, the first V electrodes Ev1, and the second V electrodes Ev2 through the fifth electrode terminal Te5, the sixth electrode terminal Te6, the seventh electrode terminal Te7, and the eighth electrode terminal Te8.

The following describes operation of the illumination device 1. The illumination device 1 has four operation modes, namely, a first operation mode in which light from the light source 20 is emitted without diffusion, a second operation mode in which emission light from the illumination device 1 is emitted in diffusion in the X direction, a third operation mode in which emission light from the illumination device 1 is diffused in the Y direction, and a fourth operation mode in which emission light from the illumination device 1 is emitted in diffusion in each of the X and Y directions.

Figure 8:
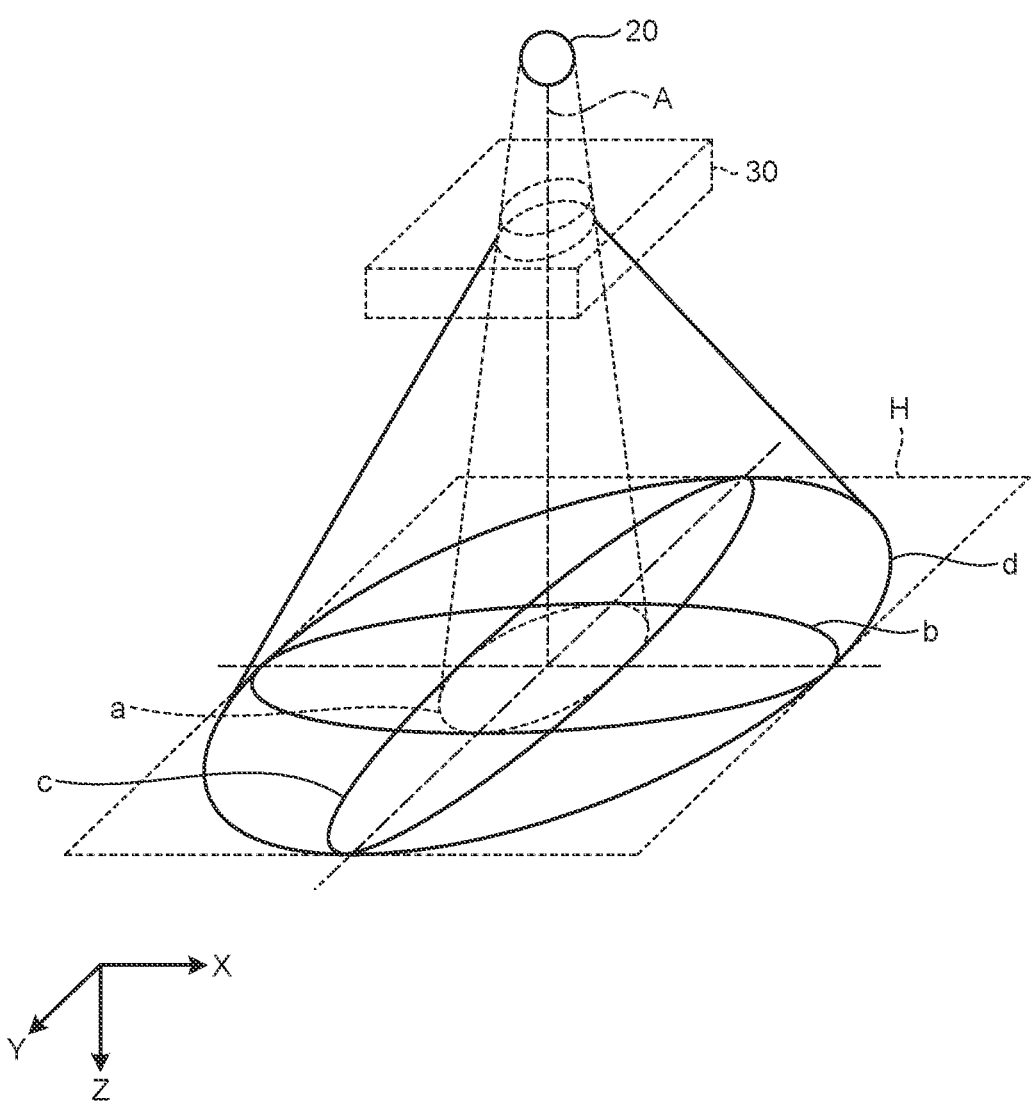
FIG. 8 is a diagram illustrating an irradiation range of emission light from the illumination device on a virtual plane orthogonal to the Z direction.

The following first describes operation of the illumination device 1 in the first operation mode. FIG. 8 is a diagram illustrating the irradiation range of emission light from the illumination device 1 on a virtual plane H orthogonal to the Z direction. An axis A illustrated in FIG. 8 is the optical axis of the light source 20 and aligned with in the Z direction.

In the first operation mode, the control device 40 applies no voltage to the first U electrodes Eu1, the second U electrodes Eu2, the first V electrodes Ev1, and the second V electrodes Ev2. In this case, light from the light source 20 transmits through the liquid crystal layers 53 of the plurality of light adjustment panels 50 without diffusion. The irradiation range of emission light from the illumination device 1 on the virtual plane H in this case corresponds to a range surrounded by an outline "a" illustrated with a dashed line.

The following describes operation of the illumination device 1 in the second operation mode. In the second operation mode, the control device 40 applies voltage to the first U electrodes Eu1 and the second U electrodes Eu2 of the first light adjustment panel 50A, the first U electrodes Eu1 and the second U electrodes Eu2 of the second light adjustment panel 50B, the first V electrodes Ev1 and the second V electrodes Ev2 of the third light adjustment panel 50C, and the first V electrodes Ev1 and the second V electrodes Ev2 of the fourth light adjustment panel 50D.

In this case, a p-polarization component of light from the light source 20 in the X direction is orthogonal to the first U electrodes Eu1 and the second U electrodes Eu2 of the first light adjustment panel 50A to which voltage is applied. Thus, the p-polarization component of light from the light source 20 is diffused in the X direction as described above when transmitting through the liquid crystal layer 53 of the first light adjustment panel 50A.

Moreover, the p-polarization component of light from the light source 20 is rotated through the liquid crystal layer 53 of each of the first light adjustment panel 50A, the second light adjustment panel 50B, and the third light adjustment panel 50C and becomes orthogonal to the first V electrodes Ev1 and the second V electrodes Ev2 of the fourth light adjustment panel 50D to which voltage is applied. Thus, the p-polarization component of light from the light source 20 is diffused in the X direction as described above when transmitting through the liquid crystal layer 53 of the fourth light adjustment panel 50D.

In the second operation mode, an s-polarization component of light from the light source 20 in the Y direction is rotated through the liquid crystal layer 53 of the first light adjustment panel 50A and becomes orthogonal to the first U electrodes Eu1 and the second U electrodes Eu2 of the second light adjustment panel 50B to which voltage is applied. Thus, the s-polarization component of light from the light source 20 is diffused in the X direction as described above when transmitting through the liquid crystal layer 53 of the second light adjustment panel 50B.

Moreover, the s-polarization component of light from the light source 20 is rotated through the liquid crystal layer 53 of each of the second light adjustment panel 50B and the third light adjustment panel 50C and becomes orthogonal to the first V electrodes Ev1 and the second V electrodes Ev2 of the third light adjustment panel 50C to which voltage is applied. Thus, the s-polarization component of light from the light source 20 is diffused in the X direction as described above when transmitting through the liquid crystal layer 53 of the third light adjustment panel 50C.

When the p-polarization and s-polarization components of light from the light source 20 are diffused in the X direction in this manner, the irradiation range of emission light from the illumination device 1 on the virtual plane H corresponds to a range surrounded by an outline "b" extending in the X direction.

The following describes operation of the illumination device 1 in the third operation mode. In the third operation mode, the control device 40 applies voltage to the first V electrodes Ev1 and the second V electrodes Ev2 of the first light adjustment panel 50A, the first V electrodes Ev1 and the second V electrodes Ev2 of the second light adjustment panel 50B, the first U electrodes Eu1 and the second U electrodes Eu2 of the third light adjustment panel 50C, and the first U electrodes Eu1 and the second U electrodes Eu2 of the fourth light adjustment panel 50D.

In this case, the p-polarization component of light from the light source 20 is diffused in the Y direction as described above when transmitting through the liquid crystal layers 53 of the first light adjustment panel 50A and the fourth light adjustment panel 50D. The s-polarization component of light from the light source 20 is diffused in the Y direction as described above when transmitting through the liquid crystal layers 53 of the second light adjustment panel 50B and the third light adjustment panel 50C.

When the p-polarization and s-polarization components of light from the light source 20 are diffused in the Y direction in this manner, the irradiation range of emission light from the illumination device 1 on the virtual plane H corresponds to a range surrounded by an outline "c" extending in the Y direction.

The following describes operation of the illumination device 1 in the fourth operation mode. In the fourth operation mode, the control device 40 applies voltage to the first U electrodes Eu1, the second U electrodes Eu2, the first V electrodes Ev1, and the second V electrodes Ev2 in each of the four light adjustment panels 50.

In this case, the p-polarization component of light from the light source 20 is diffused in each of the X and Y directions as described above when transmitting through the liquid crystal layers 53 of the first light adjustment panel 50A and the fourth light adjustment panel 50D. The s-polarization component of light from the light source 20 is diffused in each of the X and Y directions as described above when transmitting through the liquid crystal layers 53 of the second light adjustment panel 50B and the third light adjustment panel 50C.

When the p-polarization and s-polarization components of light from the light source 20 is diffused in each of the X and Y directions in this manner, the irradiation range of emission light from the illumination device 1 on the virtual plane H corresponds to a range surrounded by an outline "d" extending in each of the X and Y directions.

In this manner, the illumination device 1 operates in the above-described four operation modes when electrodes to which voltage is applied are selected in the configuration in which the plurality of light adjustment panels 50 are disposed. Since each light adjustment panel 50 includes the first terminal group TG1 and the second terminal group TG2, the above-described four operation modes can be achieved by adjusting the orientation of the light adjustment panel 50 about the Z direction without changing arrangement of components of the light adjustment panel 50 nor changing arrangement of the flexible printed circuit 70. The above-described disposition combination of the plurality of light adjustment panels 50 and combination of electrodes to which voltage is applied in each operation mode are not limited to those described above.

The following describes conduction examinations executed at manufacturing of each light adjustment panel 50. In a first conduction examination among two conduction examinations, it is checked whether the third electrode pad Pe3 and the seventh electrode pad Pe7 are electrically coupled to each other by the first coupling member B1.

The first conduction examination executes first conduction check that checks whether the first electrode terminal Te1 and the second examination terminal Tt2 are electrically coupled to each other. Since the light adjustment panel 50 is configured as described above, the first electrode terminal Te1 is electrically coupled to the second examination terminal Tt2 through the third wire L3, the third electrode pad Pe3, the first coupling member B1, the seventh electrode pad Pe7, the ninth wire L9, the sixth examination pad Pt6, the second coupling member B2, the second examination pad Pt2, and the sixth wire L6.

Accordingly, it can be checked that the third electrode pad Pe3 and the seventh electrode pad Pe7 are electrically coupled to each other by the first coupling member B1 in a case where it is checked in the first conduction check that the first electrode terminal Te1 and the second examination terminal Tt2 are electrically coupled to each other.

The first conduction examination also executes second conduction check that checks whether the fifth electrode terminal Te5 and the fourth examination terminal Tt4 are electrically coupled to each other. Since the light adjustment panel 50 is configured as described above, the fifth electrode terminal Te5 is electrically coupled to the fourth examination terminal Tt4 through the third wire L3, the third electrode pad Pe3, the first coupling member B1, the seventh electrode pad Pe7, the ninth wire L9, the eighth examination pad Pt8, the third coupling member B3, the fourth examination pad Pt4, and the eighth wire L8.

Accordingly, it can be checked that the third electrode pad Pe3 and the seventh electrode pad Pe7 are electrically coupled to each other by the first coupling member B1 in a case where it is checked in the second conduction check that the fifth electrode terminal Te5 and the fourth examination terminal Tt4 are electrically coupled to each other.

Thus, the result of the first conduction examination is non-defective in a case where it is checked in at least one of the first conduction check and the second conduction check that the third electrode pad Pe3 and the seventh electrode pad Pe7 are electrically coupled to each other by the first coupling member B1.

The third electrode pad Pe3 and the seventh electrode pad Pe7 are potentially not electrically coupled to each other by the first coupling member B1 in a case where it cannot be checked in the first conduction check that the first electrode terminal Te1 and the second examination terminal Tt2 are electrically coupled to each other and it cannot be checked in the second conduction check that the fifth electrode terminal Te5 and the fourth examination terminal Tt4 are electrically coupled to each other. In this case, the result of the first conduction examination is defective.

In a second conduction examination, it is checked whether the fourth electrode pad Pe4 and the eighth electrode pad Pe8 are electrically coupled to each other by the fourth coupling member B4.

The second conduction examination executes third conduction check that checks whether the fourth electrode terminal Te4 and the first examination terminal Tt1 are electrically coupled to each other. Since the light adjustment panel 50 is configured as described above, the fourth electrode terminal Te4 is electrically coupled to the first examination terminal Tt1 through the fourth wire L4, the fourth electrode pad Pe4, the fourth coupling member B4, the eighth electrode pad Pe8, the tenth wire L10, the fifth examination pad Pt5, the second coupling member B2, the first examination pad Pt1, and the fifth wire L5.

Accordingly, it can be checked that the fourth electrode pad Pe4 and the eighth electrode pad Pe8 are electrically coupled to each other by the fourth coupling member B4 in a case where it is checked in the third conduction check that the fourth electrode terminal Te4 and the first examination terminal Tt1 are electrically coupled to each other.

The second conduction examination also executes fourth conduction check that checks whether the eighth electrode terminal Te8 and the third examination terminal Tt3 are electrically coupled to each other. Since the light adjustment panel 50 is configured as described above, the eighth electrode terminal Te8 is electrically coupled to the third examination terminal Tt3 through the fourth wire L4, the fourth electrode pad Pe4, the fourth coupling member B4, the eighth electrode pad Pe8, the tenth wire L10, the seventh examination pad Pt7, the third coupling member B3, the third examination pad Pt3, and the seventh wire L7.

Accordingly, it can be checked that the fourth electrode pad Pe4 and the eighth electrode pad Pe8 are electrically coupled to each other by the fourth coupling member B4 in a case where it is checked in the fourth conduction check that the eighth electrode terminal Te8 and the third examination terminal Tt3 are electrically coupled to each other.

Thus, the result of the second conduction examination is non-defective in a case where it is checked in at least one of the third conduction check and the fourth conduction check that the fourth electrode pad Pe4 and the eighth electrode pad Pe8 are electrically coupled to each other by the fourth coupling member B4.

The fourth electrode pad Pe4 and the eighth electrode pad Pe8 are potentially not electrically coupled to each other by the fourth coupling member B4 in a case where it is cannot be checked in the third conduction check that the fourth electrode terminal Te4 and the first examination terminal Tt1 are electrically coupled to each other and it cannot be checked in the fourth conduction check that the eighth electrode terminal Te8 and the third examination terminal Tt3 are electrically coupled to each other. In this case, the result of the second conduction examination is defective.

In this manner, it is possible to check that the first substrate 51 and the second substrate 52 are electrically coupled to each other through the first coupling member B1 and the fourth coupling member B4, in other words, conduction through the first coupling member B1 and the fourth coupling member B4 electrically coupling the first substrate 51 and the second substrate 52.

The following describes operation of the discharge resistors R.

The first U electrodes Eu1 are electrically coupled to the first V electrodes Ev1 through the first discharge resistor R1 as described above. Accordingly, the first discharge resistor R1 uniformizes distribution of electric charge between the first U electrodes Eu1 and the first V electrodes Ev1 and solves the potential difference between the electrodes when the light adjustment panel 50 is not operating.

The first U electrodes Eu1 are also electrically coupled to the second V electrodes Ev2 through the second discharge resistor R2 as described above. Accordingly, the second discharge resistor R2 uniformizes distribution of electric charge between the first U electrodes Eu1 and the second V electrodes Ev2 and solves the potential difference between the electrodes when the light adjustment panel 50 is not operating.

The first U electrodes Eu1 are also electrically coupled to the second U electrodes Eu2 through the second discharge resistor R2 and the third discharge resistor R3 as described above. Accordingly, the second discharge resistor R2 and the third discharge resistor R3 uniformize distribution of electric charge between the first U electrodes Eu1 and the second U electrodes Eu2 and solve the potential difference between the electrodes when the light adjustment panel 50 is not operating.

The second U electrodes Eu2 are electrically coupled to the first V electrodes Ev1 through the first discharge resistor R1, the second discharge resistor R2, and the third discharge resistor R3 as described above. Accordingly, the first discharge resistor R1, the second discharge resistor R2, and the third discharge resistor R3 uniformize distribution of electric charge between the second U electrodes Eu2 and the first V electrodes Ev1 and solves the potential difference between the electrodes when the light adjustment panel 50 is not operating.

The second U electrodes Eu2 are also electrically coupled to the second V electrodes Ev2 through the third discharge resistor R3 as described above. Accordingly, the third discharge resistor R3 uniformizes distribution of electric charge between the second U electrodes Eu2 and the second V electrodes Ev2 and solves the potential difference between the electrodes when the light adjustment panel 50 is not operating.

The first V electrodes Ev1 are electrically coupled to the second V electrodes Ev2 through the first discharge resistor R1 and the second discharge resistor R2 as described above.

Accordingly, the first discharge resistor R1 and the second discharge resistor R2 uniformize distribution of electric charge between the first V electrodes Ev1 and the second V electrodes Ev2 and solves the potential difference between the electrodes when the light adjustment panel 50 is not operating.

Electric charge between two kinds of electrodes among the first U electrodes Eu1, the second U electrodes Eu2, the first V electrodes Ev1, and the second V electrodes Ev2 is generated when the light adjustment panel 50 retains static electricity, for example, at manufacturing of the light adjustment panel 50.

In a case where electric charge exists between two kinds of electrodes among the first U electrodes Eu1, the second U electrodes Eu2, the first V electrodes Ev1, and the second V electrodes Ev2, electric charge between the two kinds of electrodes affects the liquid crystal molecules and the transmittance of the light adjustment panel 50 potentially decreases when the light adjustment panel 50 is not operating. The appearance of the light adjustment panel 50 degrades as the transmittance of the light adjustment panel 50 decreases when the light adjustment panel 50 is not operating. Accordingly, in the process of manufacturing the light adjustment panel 50, it is potentially falsely determined that the light adjustment panel 50 has a defect even when the light adjustment panel 50 has no defect.

However, the discharge resistors R consume electric charge between the two kinds of electrodes, which prevents decrease of the transmittance of the light adjustment panel 50 when the light adjustment panel 50 is not operating. Thus, in the process of manufacturing the light adjustment panel 50, it is possible to prevent false determination that the light adjustment panel 50 has a defect due to degradation of the appearance of the light adjustment panel 50 even when the light adjustment panel 50 has no defect.

Preferable embodiments of the present disclosure are described above, but the present disclosure is not limited to such embodiments. Contents disclosed in the embodiments are merely exemplary, and various kinds of modifications are possible without departing from the scope of the present disclosure. Any modification performed as appropriate without departing from the scope of the present disclosure belongs to the technical scope of the present disclosure.

For example, each coupling member B may individually electrically couple two electrode pads Pe facing each other in the Z direction. In this case, the coupling member B is a conductive wire or a conductive bonding agent that is not anisotropic.

Each light adjustment panel 50 may include no second terminal group TG2. In this case, the light adjustment panel 50 may include none of the third examination pad Pt3, the fourth examination pad Pt4, the seventh examination pad Pt7, the eighth examination pad Pt8, and the third coupling member B3.

The discharge resistors R may be disposed on the first substrate 51.

The light adjustment panel 50 may include no discharge resistors R. In this case, the first U electrodes Eu1, the second U electrodes Eu2, the first V electrodes Ev1, and the second V electrodes Ev2 are disposed in electrical insulation from one another.

Each light adjustment panel 50 may include none of the second U electrodes Eu2 and the second V electrodes Ev2. In this case, the light adjustment panel 50 may include none of the third electrode terminal Te3, the seventh electrode terminal Te7, the second electrode pad Pe2, the fourth coupling member B4, the sixth electrode pad Pe6, and the third discharge resistor R3 that are electrically coupled to the second U electrodes Eu2. In addition, in this case, the light adjustment panel 50 may include none of the eighth electrode pad Pe8, the fourth electrode pad Pe4, the fourth electrode terminal Te4, the eighth electrode terminal Te8, and the second discharge resistor R2 that are electrically coupled to the second V electrodes Ev2.

The first U electrodes Eu1, the second U electrodes Eu2, the first V electrodes Ev1, and the second V electrodes Ev2 are not limited to a bar shape but may have a rectangular shape in plan view.

It should be understood that the present disclosure provides any other effects achieved by aspects described above in the embodiments, such as effects that are clear from the description of the present specification or effects that could be thought of by the skilled person in the art as appropriate.

Each first U electrode Eu1 corresponds to a "first electrode", each first V electrode Ev1 corresponds to a "second electrode", and the second U electrode Eu2 corresponds to a "third electrode". The first electrode terminal Te1 corresponds to a "first terminal", the second examination terminal Tt2 corresponds to a "second terminal", the fifth electrode terminal Te5 corresponds to a "third terminal", and the fourth examination terminal Tt4 corresponds to a "fourth terminal".

The third electrode pad Pe3 corresponds to a "first conductive portion", the second examination pad Pt2 corresponds to a "second conductive portion", the seventh electrode pad Pe7 corresponds to a "third conductive portion", the sixth examination pad Pt6 corresponds to a "fourth conductive portion", and the fourth examination pad Pt4 corresponds to a "fifth conductive portion". The eighth examination pad Pt8 corresponds to a "sixth conductive portion", the first electrode pad Pe1 corresponds to a "seventh conductive portion", the fifth electrode pad Pe5 corresponds to an "eighth conductive portion", the second electrode pad Pe2 corresponds to a "ninth conductive portion", and the sixth electrode pad Pe6 corresponds to a "tenth conductive portion".

What is claimed is:

1. An electrooptical device comprising:
a first substrate;
a first electrode disposed on the first substrate;
a second substrate facing the first substrate;
a second electrode disposed on the second substrate; and
a liquid crystal layer positioned between the first substrate and the second substrate,
wherein
the first substrate includes
a first terminal,
a second terminal,
a first conductive portion electrically coupled to the first terminal,
a second conductive portion electrically coupled to the second terminal,
a third terminal electrically coupled to the first terminal through the first conductive portion,
a fourth terminal, and
a fifth conductive portion electrically coupled to the fourth terminal,
the second substrate includes
a third conductive portion electrically coupled to the second electrode, and
a fourth conductive portion electrically coupled to the third conductive portion,
a sixth conductive portion electrically coupled to the third conductive portion, and the electrooptical device further includes
a first coupling member electrically coupling the first conductive portion and the third conductive portion,
a second coupling member electrically coupling the second conductive portion and the fourth conductive portion
a third coupling member electrically coupling the fifth conductive portion and the sixth conductive portion.

2. The electrooptical device according to claim 1, wherein the first substrate further includes
a first terminal group including the first terminal and the second terminal, and
a second terminal group including the third terminal and the fourth terminal.

3. An electrooptical device comprising:
a first substrate;
a first electrode disposed on the first substrate;
a second substrate facing the first substrate;
a second electrode disposed on the second substrate;
a liquid crystal layer positioned between the first substrate and the second substrate; and
a first discharge resistor,
wherein
the first substrate includes
a first terminal,
a second terminal,
a first conductive portion electrically coupled to the first terminal,
a second conductive portion electrically coupled to the second terminal, the second substrate includes
a third conductive portion electrically coupled to the second electrode, and
a fourth conductive portion electrically coupled to the third conductive portion, and
the electrooptical device further includes
a first coupling member electrically coupling the first conductive portion and the third conductive portion, and
a second coupling member electrically coupling the second conductive portion and the fourth conductive portion, and
the first electrode and the second electrode are electrically coupled to each other through the first discharge resistor.

4. The electrooptical device according to claim 3, wherein the first substrate further includes a seventh conductive portion electrically coupled to the first electrode,
the second substrate further includes an eighth conductive portion electrically coupled to the seventh conductive portion,
the first discharge resistor is disposed on the second substrate, and
the eighth conductive portion is electrically coupled to the second electrode through the first discharge resistor.

5. An electrooptical device comprising:
a first substrate;
a first electrode disposed on the first substrate;
a second substrate facing the first substrate;
a second electrode disposed on the second substrate;
a liquid crystal layer positioned between the first substrate and the second substrate;
a second discharge resistor; and
a third electrode disposed on the first substrate,
wherein
the first substrate includes
a first terminal,
a second terminal, a first conductive portion electrically coupled to the first terminal,
a second conductive portion electrically coupled to the second terminal,
the second substrate includes
a third conductive portion electrically coupled to the second electrode, and
a fourth conductive portion electrically coupled to the third conductive portion, and
the electrooptical device further includes
a first coupling member electrically coupling the first conductive portion and the third conductive portion, and
a second coupling member electrically coupling the second conductive portion and the fourth conductive portion, and
the first electrode and the third electrode are electrically coupled to each other through the second discharge resistor.

6. The electrooptical device according to claim 5, wherein the first substrate further includes
a seventh conductive portion electrically coupled to the first electrode, and
a ninth conductive portion electrically coupled to the third electrode,
the second substrate further includes
an eighth conductive portion electrically coupled to the seventh conductive portion, and
a tenth conductive portion electrically coupled to the ninth conductive portion,
the second discharge resistor is disposed on the second substrate, and
the tenth conductive portion is electrically coupled to the eighth conductive portion through the second discharge resistor.

7. An illumination device comprising:
the electrooptical device according to claim 1; and
a light source configured to emit light toward the electrooptical device.

8. An illumination device comprising:
the electrooptical device according to claim 3; and
a light source configured to emit light toward the electrooptical device.

9. An illumination device comprising:
the electrooptical device according to claim 5; and
a light source configured to emit light toward the electrooptical device.

* * * * *